(12) United States Patent
Zhang

(10) Patent No.: US 11,627,132 B2
(45) Date of Patent: Apr. 11, 2023

(54) KEY-BASED CROSS DOMAIN REGISTRATION AND AUTHORIZATION

(71) Applicant: INTERNATIONAL BUSINESS MACHINES CORPORATION, Armonk, NY (US)

(72) Inventor: Ling Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 275 days.

(21) Appl. No.: 16/007,313

(22) Filed: Jun. 13, 2018

(65) Prior Publication Data

US 2019/0386994 A1    Dec. 19, 2019

(51) Int. Cl.
  *H04L 29/06*    (2006.01)
  *H04L 12/24*    (2006.01)
  *H04L 9/40*    (2022.01)

(52) U.S. Cl.
  CPC ............ *H04L 63/10* (2013.01); *H04L 63/062* (2013.01); *H04L 63/123* (2013.01)

(58) Field of Classification Search
  CPC ... H04L 63/10; H04L 63/123; H04L 63/0807; H04L 63/062
  USPC .......................................................... 726/4
  See application file for complete search history.

(56) References Cited

U.S. PATENT DOCUMENTS

| | | | | |
|---|---|---|---|---|
| 5,768,519 A | * | 6/1998 | Swift | H04W 12/086 709/223 |
| 8,607,054 B2 | * | 12/2013 | Ramarathinam | H04L 63/168 713/172 |
| 9,047,393 B1 | | 6/2015 | Grieve et al. | |
| 9,307,036 B2 | | 4/2016 | Zhang et al. | |
| 9,697,188 B2 | | 7/2017 | Kolam et al. | |
| 9,866,375 B2 | * | 1/2018 | Reilly | H04L 9/0822 |
| 10,110,579 B2 | * | 10/2018 | Fitch | H04L 63/08 |
| 10,116,440 B1 | * | 10/2018 | Rudzitis | H04L 9/0822 |
| 10,291,722 B1 | * | 5/2019 | Mendez | H04L 65/1069 |
| 10,417,588 B1 | * | 9/2019 | Kreisel | G06Q 40/08 |
| 2005/0172138 A1 | * | 8/2005 | Ezzat | G06F 12/1491 713/189 |
| 2007/0245018 A1 | * | 10/2007 | Bhola | H04L 63/102 709/225 |
| 2007/0289006 A1 | * | 12/2007 | Ramachandran | H04L 9/3263 726/10 |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Haresh N Patel
(74) *Attorney, Agent, or Firm* — Kristofer L. Haggerty

(57) ABSTRACT

The present invention generally relates to computer security, and more specifically, related to registration and authorization cross multiple domains. In an aspect, a computer-implemented method, computer-implemented system, and computer program product for cross domain registration by a source domain is provided. A request is sent by a source domain to register the source domain as a trusted domain of a target domain. An approval of the request is received by the source domain. The source domain issues a key to an application of the source domain for accessing the target domain.

17 Claims, 7 Drawing Sheets

(56) References Cited

U.S. PATENT DOCUMENTS

| | | | |
|---|---|---|---|
| 2008/0044010 A1* | 2/2008 | Vasyltasov | H04L 9/3066 380/28 |
| 2008/0091765 A1* | 4/2008 | Gammage | H04L 51/12 709/202 |
| 2008/0159299 A1* | 7/2008 | Bu | H04L 63/10 370/400 |
| 2008/0255994 A1* | 10/2008 | Schnell | G06Q 20/00 705/52 |
| 2008/0263363 A1* | 10/2008 | Jueneman | G06F 21/6218 713/184 |
| 2009/0150968 A1* | 6/2009 | Ozzie | H04L 63/08 726/1 |
| 2009/0240941 A1* | 9/2009 | Lee | H04L 9/3263 713/169 |
| 2009/0254745 A1* | 10/2009 | Ganesan | H04L 9/3265 713/151 |
| 2009/0320103 A1* | 12/2009 | Veeraraghavan | H04L 63/08 726/4 |
| 2010/0208898 A1* | 8/2010 | Acar | H04L 9/0891 380/280 |
| 2012/0089481 A1* | 4/2012 | Iozzia | G06F 21/606 705/26.41 |
| 2012/0167185 A1* | 6/2012 | Menezes | H04L 63/0815 726/5 |
| 2012/0266209 A1* | 10/2012 | Gooding | H04L 63/20 726/1 |
| 2012/0331376 A1* | 12/2012 | Gorokhovsky | G06F 9/451 715/234 |
| 2014/0019753 A1* | 1/2014 | Lowry | H04L 9/083 713/155 |
| 2014/0082140 A1* | 3/2014 | Toussaint | H04L 67/42 709/217 |
| 2014/0280196 A1* | 9/2014 | Jung | H04L 63/10 707/741 |
| 2015/0188779 A1 | 7/2015 | McCanne et al. | |
| 2015/0222615 A1* | 8/2015 | Allain | H04L 63/10 726/4 |
| 2016/0092267 A1* | 3/2016 | Boyacigiller | G06Q 10/0633 718/103 |
| 2016/0330182 A1* | 11/2016 | Jeon | H04L 63/062 |
| 2017/0078429 A1 | 3/2017 | Toussaint et al. | |
| 2017/0093817 A1* | 3/2017 | Khoury | H04L 63/105 |
| 2017/0099321 A1* | 4/2017 | Frahim | H04L 63/104 |
| 2018/0069751 A1* | 3/2018 | Guo | H04L 41/0803 |
| 2018/0145985 A1* | 5/2018 | Pham | H04L 63/101 |
| 2018/0241549 A1* | 8/2018 | An | H04L 9/0822 |

OTHER PUBLICATIONS

Rabinovich, "Secure Cross-Domain Cookies for HTTP", https://jisajournal.springeropen.com/articles/10.1186/1869-0238-4-13, Journal of Internet Services and Applications 2013 4:13, pp. 1-30.

IBM, "Cross-Origin Resource Sharing", https://www.ibm.com/support/knowledgecenter/en/SSMKHH_10.0.0/co . . . , IBM Integration Bus, Version 10.0.10 Operating Systems: AIX, HP-Itanium, Linux, Solaris, Windows, z/OS, printed Oct. 4, 2017, pp. 1-3.

Wikipedia, "Cross-origin resource sharing," Wikipedia—The Free Encyclopedia, Accessed: Jan. 10, 23, https://en.wikipedia.org/wiki/Cross-origin_resource_sharing, 6 pages.

\* cited by examiner

KEY-BASED CROSS DOMAIN REGISTRATION AND AUTHORIZATION

BACKGROUND

The present invention generally relates to computer security, and more specifically, relates to registration and authorization across multiple domains.

SUMMARY

In an aspect, a computer-implemented method for cross domain registration by a source domain is provided. In this method, a request is sent for being registered as a trusted domain of a target domain. An approval of the request for being registered as the trusted domain is received. A key is issued to an application of the source domain for accessing the target domain.

In another aspect, a computer-implemented method for cross domain authorization by a target domain is provided. According to the method, a request to register a source domain as a trusted domain of the target domain is received by a target domain. The request to register the target domain is approved. The target domain receives both a key of an application of the source domain for accessing the target domain and a token identifying the source domain. The target domain checks validity of the key and the token. In response to both the key and the token being valid, the access from the application of the source domain is allowed.

In yet another aspect, a computer-implemented system for cross domain registration by a source domain is provided. The system comprises one or more processors, a memory coupled to at least one of the processors, and a set of computer program instructions stored in the memory and executed by at least one of the processors in order to perform a method comprising the steps of sending a request for being registered as a trusted domain of a target domain. An approval of the request for being registered as the trusted domain is received. A key is issued to an application of the source domain for accessing the target domain.

In yet another aspect, a computer-implemented system for cross domain authorization by a target domain is provided. The system comprises one or more processors, a memory coupled to at least one of the processors, and a set of computer program instructions stored in the memory and executed by at least one of the processors in order to perform a method comprising the steps of receiving a request to register a source domain as a trusted domain of the target domain by a target domain. The request to register the target domain is approved. The target domain receives both a key of an application of the source domain for accessing the target domain and a token identifying the source domain. The target domain checks validity of the key and the token. In response to both the key and the token being valid, the access from the application of the source domain is allowed.

The embodiments and aspects, including but not limited to computer program product, are described in detail herein and are considered a part of the claimed invention.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
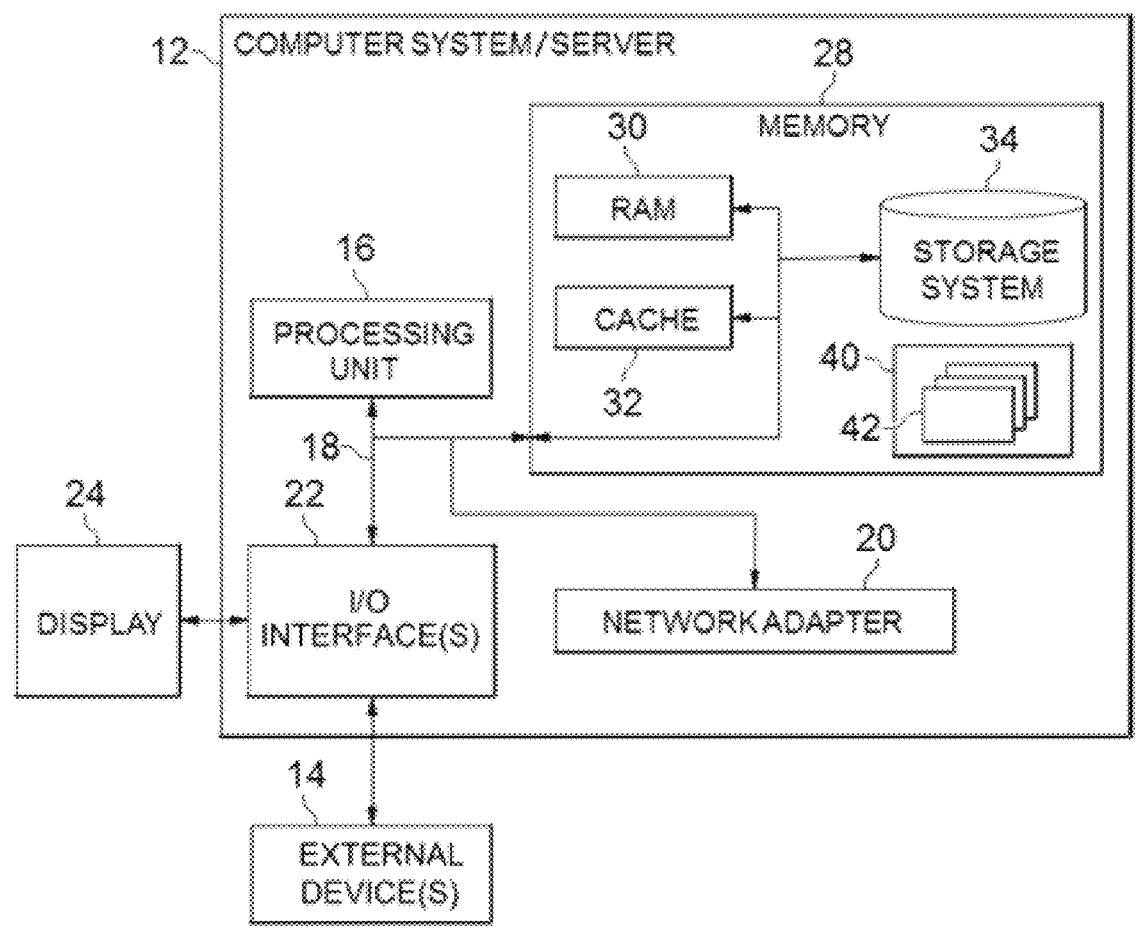
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
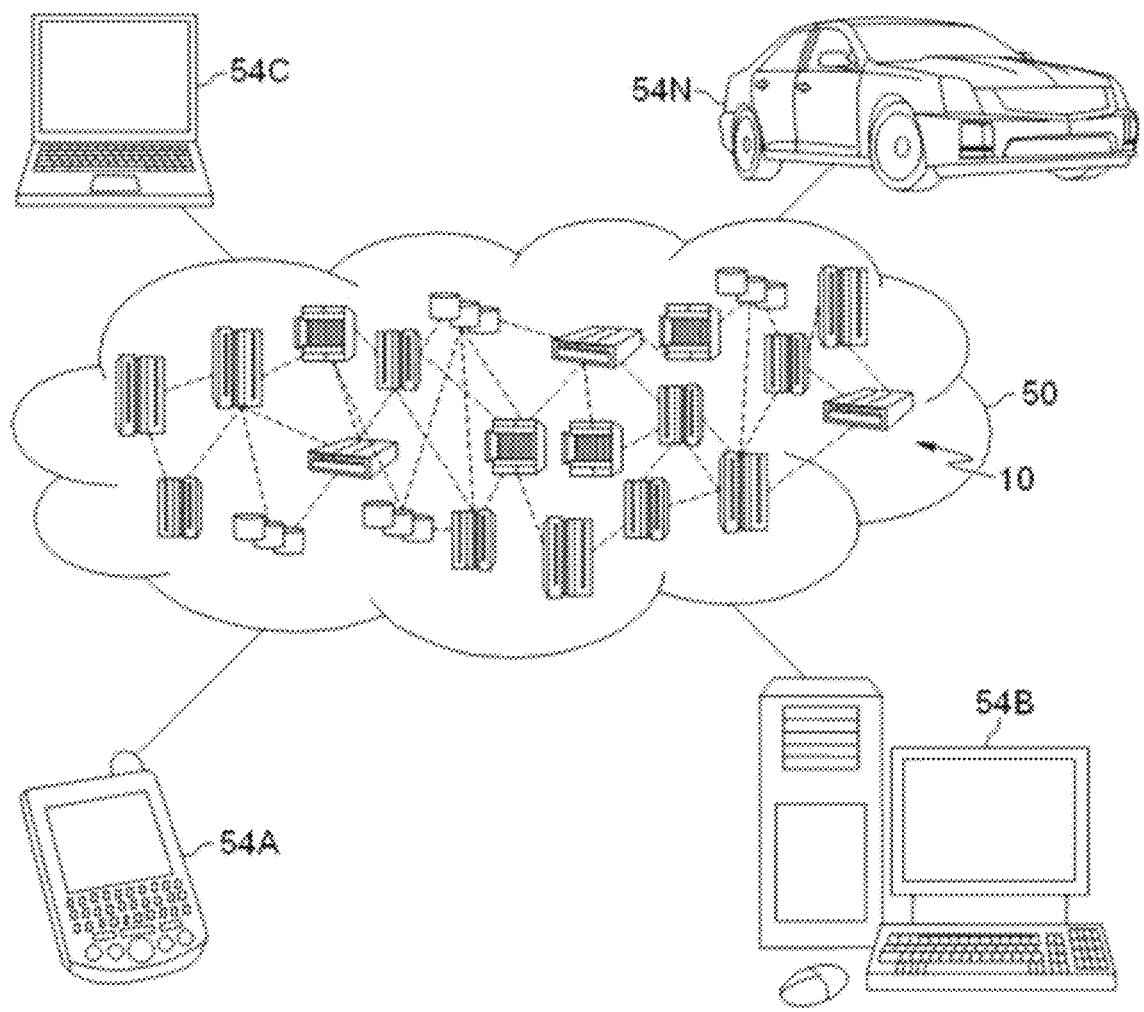
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
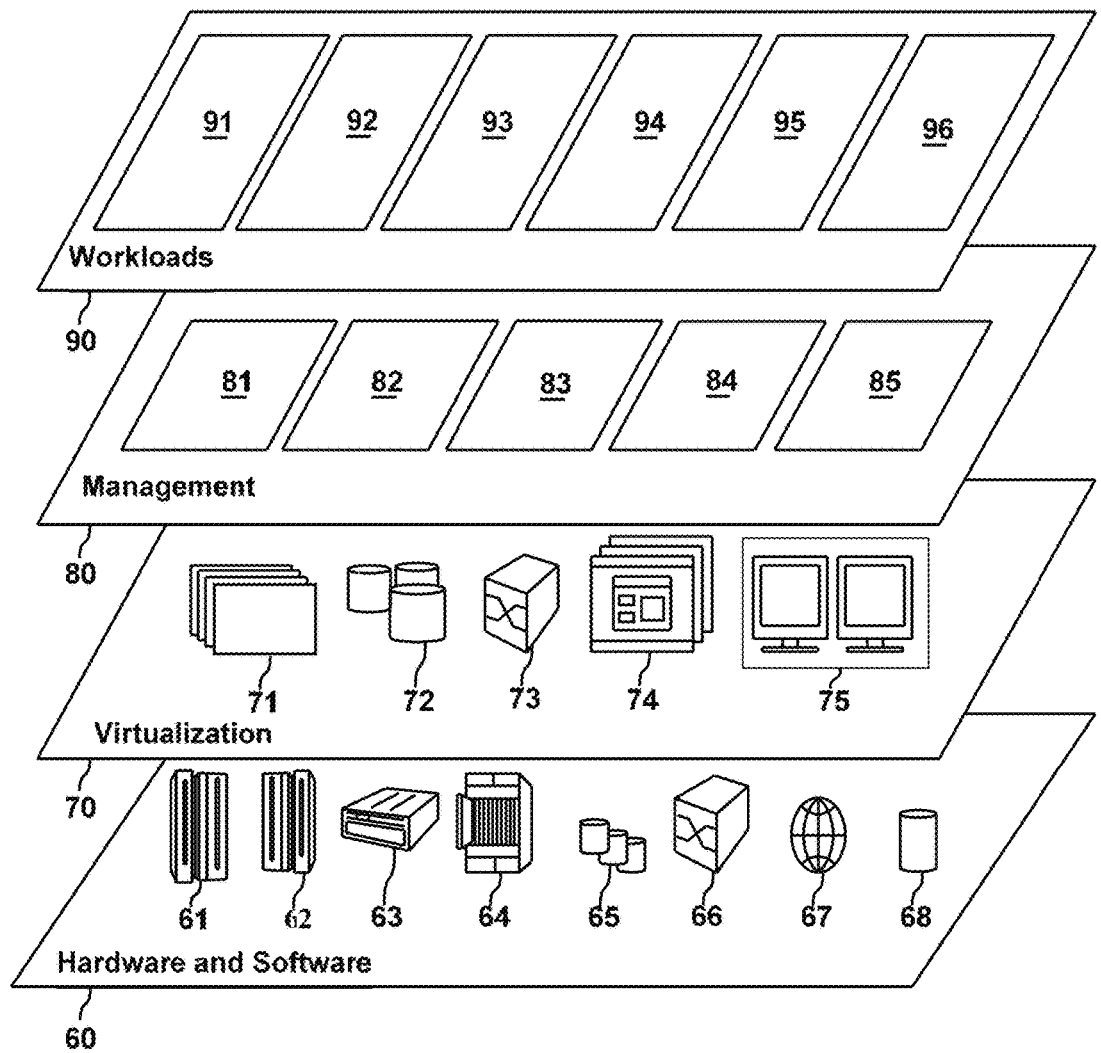
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cross domain registration/authorization 96.

The presently disclosed invention discusses Cross Origin Resource Sharing. Cross Origin Resource Sharing is a W3C specification to define secure cross domain HTTP requests. Before CORS, cross domain requests are forbidden due to the security reason. With CORS, web browsers are allowed to send cross domain HTTP requests to get data from other remote sites with restriction of following the CORS specification.

A website can use CORS to build whitelist/blacklist allow/disallow list to selectively control incoming cross domain requests. For example, a source domain can add "origin" header in the HTTP request to access a target domain (a website for example). The target domain can then check the validity of the "origin" header to allow or disallow an access from the source domain. However, current CORS mechanism checking for trusted origins by simply checking URL of the source domain is not enough for some use cases. For example, a social media web site could host many applications: some are built by third parties, some are under testing/pilot status, etc. Those applications could have potential security risk. If all cross domain requests from the source domain are allowed, all applications can then take advantage of this, which could cause security exposure of the target domain. It is desired to adopt an application level management in the source domain to manage the number of applications which are permitted to access the target domain.

Based on existing CORS specification, the target domain can authorize the trusted source domain (for example a website) a secret domain token to represent the source website. According to an embodiment of this invention, the source domain can issue keys for applications which are running on the source domain and are eligible to access the target domain. As a result, the source domain can achieve fine-grained management regarding to it applications. The source domain could, therefore, make sure those eligible applications being able to pass the authorization process checked by the target domain hence being allowed to access the target domain.

According to an embodiment of this invention, on the target domain, in response to receiving CORS request from the source domain, checking will occur of both the token of the source domain and the key associated with the application of the source domain. Communication can only start when both the token and the key are valid.

Figure 4:
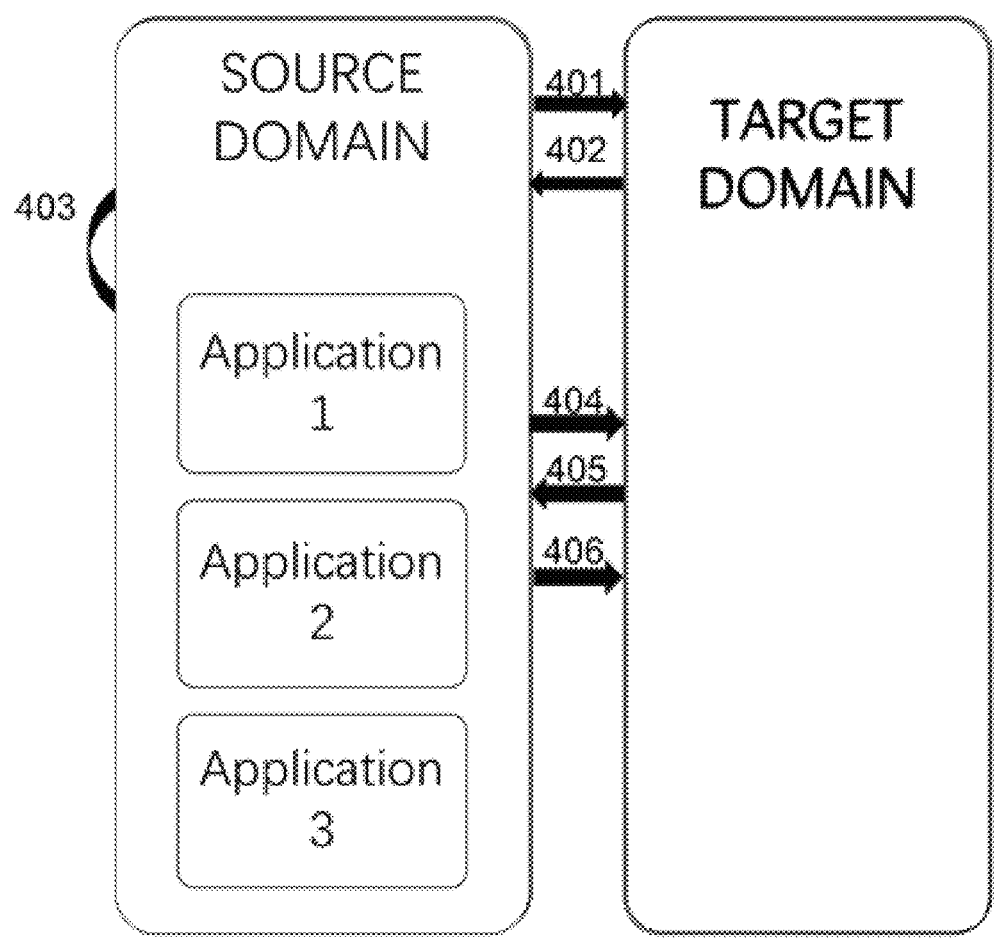
FIG. 4 depicts a diagram of a system according to an embodiment of the present invention for application level registration/authorization.

FIG. 4 depicts a diagram of a system according to an embodiment of the present invention for application level registration/authorization. Both the source domain and the target domain can be implemented on a computer system/server 12 illustrated in FIG. 1. The source domain includes multiple applications running thereon (such as application 1, application 2, application 3 as illustrated in FIG. 4). Different applications can be stored or installed in physically different servers/computers, even the servers/computers apart from that of the source domain. Even different applications can be stored or installed on different servers/computers. All applications of source domain, however, could be subject to the same root of URL.

At step 401, the source domain sends a request to register the source domain as a trusted domain of a target domain. For example, the source domain can send its URL (Uniform Resource Locator) to the target domain. In some embodiments, the request could be directly sent to the target domain, while in other embodiments, the request could be sent to a third party (like an agent, or a controller of the target domain, and so on).

At step 402, the target domain approves the request from the source domain for being registered as a trusted domain. The target domain can determine by itself if it intends to approve or reject the request. If the source domain fails to be approved as a trusted domain, all applications running on the source domain should not be able to access the target domain. Both step 401 and 402 can be performed off-line (for example in the situation that there is no actual request from any application of source domain to access the target domain yet) or on-line (for example in the situation that there is a request actually initiated from an application of the source domain to access the target domain). The target domain may record the URL of the source domain as a token of the source domain locally, which is used to identify a trusted source domain. In some embodiments, the approval could be directly sent to the source domain, while in other embodiments, the approval could be sent to a third party (like an agent, or a controller of the source domain, and so on).

The source domain may issue a key to its application for accessing the target domain at step 403. For example, but without any limitation to this invention, the source domain can issue a key to an application which it believes mature enough to be able to access the target domain. According to an embodiment of the present invention, the key could be issued in response to an application hosted on the source domain requesting to access the target domain (for example making a CORS request to the target domain), which could be understood as an on-line key issuing process. According to another embodiment of the present invention, the key could be issued before there is any actual request from the application intending to access the target domain (for example when an application is set up, it may not have immediate request to access the target domain, but it may have need to access the target domain in the future), which could be understood as an off-line key issuing process. Example of the issued key could be, but not limited to, URL of the application. In other embodiments, other values/characteristics/numbers/symbols, even a file (a certificate for example), etc. can also be used as an issued key. In some embodiments, the key of the application could (1) comprise the token of the source domain like what illustrated above, (2) be independent values/characteristics/numbers/symbols irrelevant to an expression of the token, or (3) be values/characteristics/numbers/symbols derived from the token but does not comprise the token in whole or in part (for example, the token is 1234, the key could be 2468, which represent 1234*2). In other embodiments, other methods to encode the key can be adopted as well.

The application which was issued a key could request to access the target domain at step 404 by for example, but not limited to, sending a CORS request to the target domain with its issued key. In some embodiments, if the key comprises the token of its source domain, then token does not need to be sent to the target domain separately, otherwise, if the key itself does not comprise the token, the application may send both the key as well as the token to the target domain.

The target domain could therefore check validity of the key and the token at step 405. According to an example of the present invention, checking validity of the key by the target domain could comprise sending the key received from an application back to the source domain to verify whether the application associated with the key is allowed to access the target domain, or in other words, is trusted by the source domain to access the target domain, as illustrated by step 520 of FIG. 5C. The source domain could then verify validity of the key based on above received key to determine whether an application associated with the key is allowed to access the target domain or not, and provide a verification result to the target domain as illustrated by step 521-523 of FIG. 5C. The verification result could be for example, but not limited to, a "TRUE" or "FALSE" flag. In response to receiving a positive verification result from the source domain, the target domain allows the access from the application, otherwise, the target domain could reject the access from the application. By verifying the validity of the key one by one at the source domain, the source domain could establish well management of its applications and save the resources allocated in the target domain, in which case the target domain could fully rely on the verification result of the source domain. In an additional example, and illustrated by step 515 of FIG. 5B, to avoid frequently call back the source domain for checking validity of the key received from the application, the target domain could cache all verified key in a stored list, and leverage the stored list to determine whether the key received from an application has been approved before for the same application. In some embodiments, verified keys in the stored list can be appended with a validity period or expiration date.

Figure 5A:
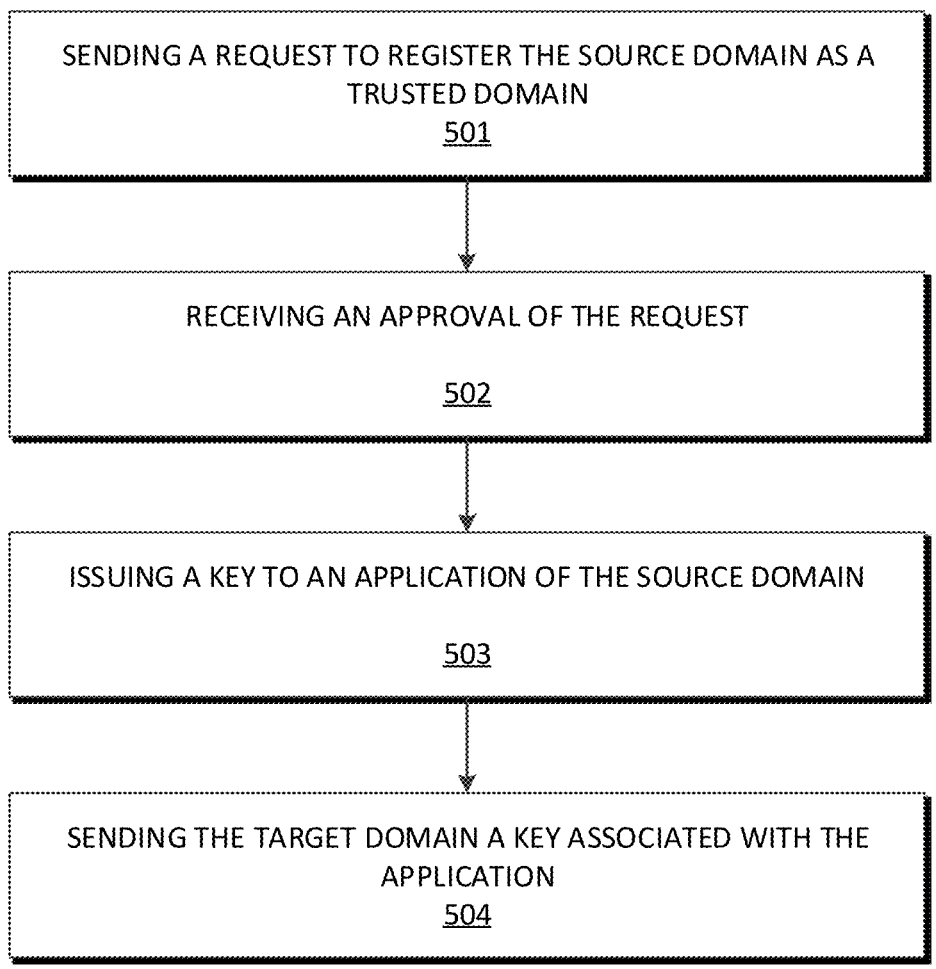
FIG. 5A depicts a flowchart of a method according to an embodiment of the present invention for cross domain registration.
Figure 5B:
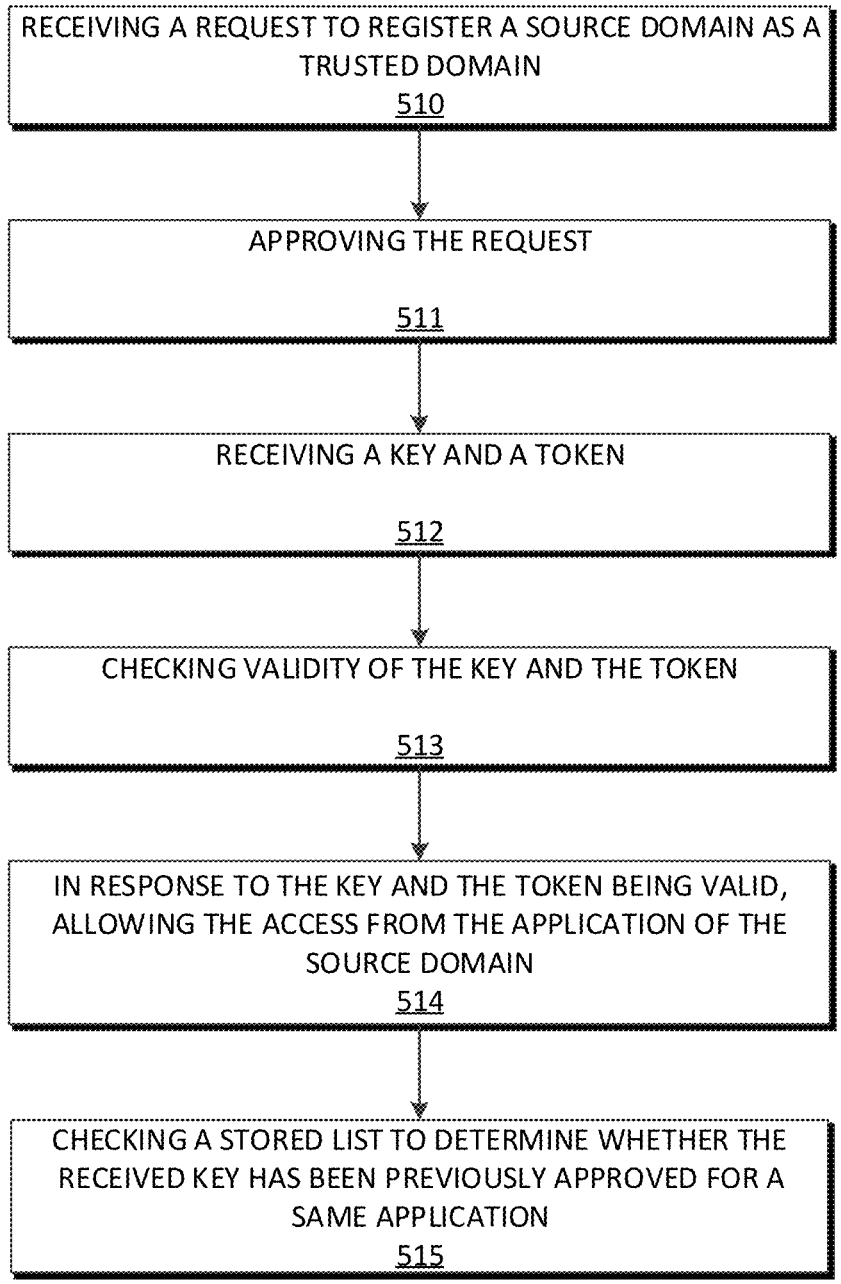
FIG. 5B depicts a flowchart of a method according to an embodiment of the present invention for cross domain authorization.
Figure 5C:
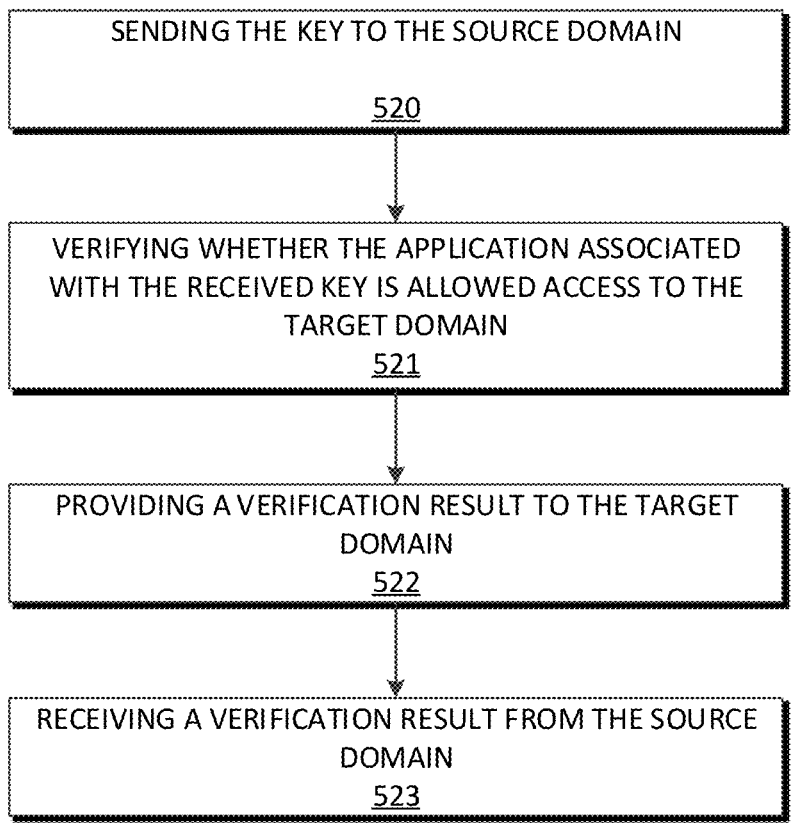
FIG. 5C depicts a flowchart of a method according to an embodiment of the present invention for cross domain authorization.
Figure 5D:
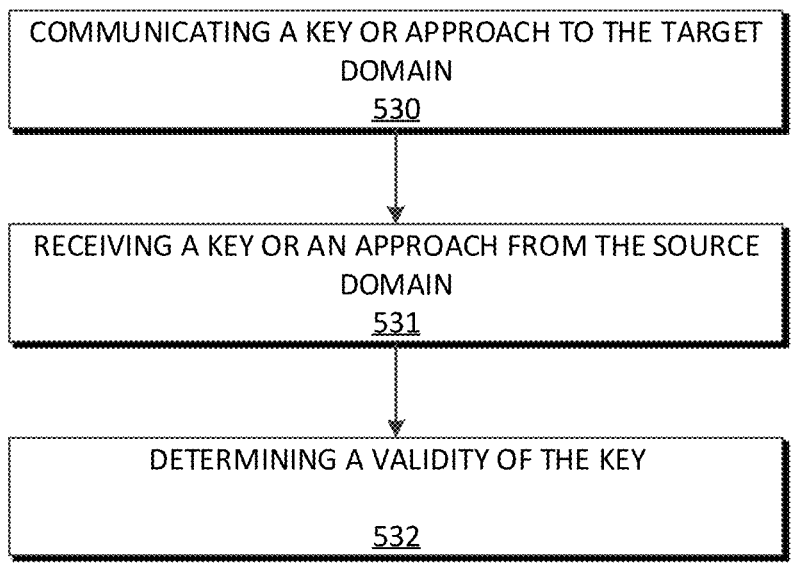
FIG. 5D depicts a flowchart of a method according to an embodiment of the present invention for cross domain authorization.

According to another example of the present invention, checking validity of the key could comprise receiving an approach (a schema for example) from the source domain to determine validity of the key, as illustrated by step 530-532 of FIG. 5D. In this example, the source domain needs to inform the target domain an approach to determine validity of the key. The approach could be, for example, but not limited to, setting the key as a number two times of that of the token, e.g. the token is 1234, and the key could be 2468. There are various of algorithm could be used to calculate the key based on the token, therefore, this invention does not suggest any limitation regarding to any specific approach adopted.

According to yet another example of the present invention, checking validity of the key could comprise requesting an issued key associated with the application from the source domain by the target domain, and checking the validity of the key received by comparing it with the issued key requested, as illustrated by step 530-532 of FIG. 5D. In this example, the source domain needs to send the target domain an issued key associated with the application. And the target domain needs to spend computing resources to compare the key received from the application with the key requested from the source domain with regards to the specific application.

At step 406, in response to both the key and the token being valid, the target domain allows the access from the application of the source domain. In some embodiments, the target domain will reject the access once either the key or the token is found invalid.

With reference now to FIG. 5A which depicts a flowchart of a method according to an embodiment of the present invention for cross domain registration. The method starts at block 501, in which the source domain sends a request for being registered as a trusted domain of a target domain. At block 502, the source domain receives an approval of the request for being registered as the trusted domain. At block 503, the source domain issues a key to an application of the source domain for accessing the target domain.

With reference now to FIG. 5B which depicts a flowchart of a method according to an embodiment of the present invention for cross domain authorization. The method in FIG. 5B may be performed by the target domain for cross domain authorization. At block 501, the target domain receives a request from the source domain to register the source domain as a trusted domain of the target domain. At block 511, the target domain approves the request. At block 512, the target domain receives both a key of an application of the source domain for accessing the target domain and a token identifying the source domain. At block 513, the target domain checks validity of the key and the token. And at block 514, in response to both the key and the token being valid, the target domain allows the access from the application of the source domain.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cross domain registration by a source domain, the method comprising:
sending, by the source domain directly to a target domain, a request to register the source domain as a trusted domain of the target domain, the trusted domain authorized to issue one or more keys to one or more applications for accessing the target domain;
receiving, by the source domain directly from the target domain, an approval of the request based on a token identifying the source domain;
issuing, by the source domain, a key to an application of the one or more applications of the source domain for accessing the target domain based on the received approval;
verifying, by the source domain, validity of the key issued to the application and passed by the target domain to determine whether the application associated with the key is allowed to access the target domain; and
providing, by the source domain, a verification result to the target domain.

2. The method of claim 1, wherein a value of the key to the application of the source domain for accessing the target domain is further based on doubling one or more values of the token.

3. The method of claim 1, further comprising:
informing, by the source domain, the target domain an approach to determine validity of the key issued to the application.

4. The method of claim 1, further comprising:
sending, by the source domain, to the target domain the key associated with the application.

5. A computer-implemented method for cross domain authorization by a target domain, the method comprising:
receiving, by the target domain directly from a source domain, a request to register a source domain as a trusted domain of the target domain, the trusted domain authorized to issue one or more keys to one or more applications for accessing the target domain;
approving, by the target domain, the request based on a token identifying the source domain;
receiving, by the target domain directly from the source domain, both a key issued by the source domain of an application of the one or more applications of the source domain for accessing the target domain and the token identifying the source domain;
checking, by the target domain, validity of the key and the token;
allowing, by the target domain, in response to both the key and the token being valid, the access from the application of the source domain;
sending, by the target domain, the received key back to the source domain to verify whether the application associated with the received key is allowed to access the target domain; and
receiving, by the target domain, a verification result from the source domain.

6. The method of claim 5, wherein a value of the key to the application of the source domain for accessing the target domain is further based on doubling one or more values of the token.

7. The method of claim 5, wherein checking validity of the received key comprises:
receiving, by the target domain, an approach from the source domain to determine validity of a key; and
determining, by the target domain, the validity of the received key by using the approach.

8. The method of claim 5, wherein checking validity of the received key comprises:
requesting, by the target domain, a key issued by the source domain, wherein the issued key is associated with the application from the source domain; and checking, by the target domain, the validity of the received key by comparing it with the issued key.

9. The method of claim 5, wherein checking validity of the received key comprises:
checking, by the target domain, a stored list to determine whether the received key has been approved before for the same application.

10. A computer-implemented system for cross domain authorization by a target domain, the system comprising:
one or more processors;
a memory coupled to at least one of the processors;
a set of computer program instructions stored in the memory and executed by at least one of the processors in order to perform actions of:
receiving, by the target domain directly from a source domain, a request to register a source domain as a trusted domain of the target domain, the trusted domain authorized to issue one or more keys to one or more applications for accessing the target domain;
approving, by the target domain, the request based on a token identifying the source domain;
receiving, by the target domain directly from the source domain, both a key issued by the source domain of an application of the one or more applications of the source domain for accessing the target domain and the token identifying the source domain;
checking, by the target domain, validity of the key and the token;
allowing, by the target domain, in response to both the key and the token being valid, the access from the application of the source domain;
sending, by the target domain, the received key back to the source domain to verify whether the application associated with the received key is allowed to access the target domain; and
receiving, by the target domain, a verification result from the source domain.

11. The system of claim 10, wherein a value of the key to the application of the source domain for accessing the target domain is further based on doubling one or more values of the token.

12. The system of claim 10, wherein checking validity of the received key comprises:
receiving, by the target domain, an approach from the source domain to determine validity of a key; and
determining, by the target domain, the validity of the received key by using the approach.

13. The system of claim 10, wherein checking validity of the received key comprises:
requesting, by the target domain, a key issued by the source domain, wherein the issued key is associated with the application from the source domain; and
checking, by the target domain, the validity of the received key by comparing it with the issued key.

14. The system of claim 10, wherein checking validity of the received key comprises:
checking, by the target domain, a stored list to determine whether the received key has been approved before for the same application.

15. The system of claim 10, wherein the set of computer program instructions perform further actions of:
verifying, by the source domain, validity of a key passed by the target domain to determine whether an application associated with the key is allowed to access the target domain; and
providing, by the source domain, a verification result to the target domain.

16. The system of claim 10, wherein the set of computer program instructions perform further actions of:
informing, by the source domain, the target domain an approach to determine validity of a key.

17. The system of claim 10, wherein the set of computer program instructions perform further actions of:
sending, by the source domain, to the target domain the key associated with the application.

* * * * *